(12) United States Patent
Okada et al.

(10) Patent No.: US 11,321,558 B2
(45) Date of Patent: May 3, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Shigeru Okada, Kanagawa (JP); Junichi Shimizu, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/827,980

(22) Filed: Mar. 24, 2020

(65) Prior Publication Data

US 2021/0081660 A1 Mar. 18, 2021

(30) Foreign Application Priority Data

Sep. 12, 2019 (JP) .............................. JP2019-166157

(51) Int. Cl.
*G06K 9/00* (2006.01)
(52) U.S. Cl.
CPC ................................ *G06K 9/00442* (2013.01)
(58) Field of Classification Search
CPC combination set(s) only.
See application file for complete search history.

(56) References Cited

U.S. PATENT DOCUMENTS

| 6,963,665 | B1 | 11/2005 | Imaizumi et al. |
| 2005/0065893 | A1* | 3/2005 | Josephson ............ G06Q 20/382 705/64 |
| 2012/0250991 | A1* | 10/2012 | Okada ................... H04N 1/642 382/166 |
| 2014/0325484 | A1* | 10/2014 | Gillaspie ............. G06F 11/3604 717/124 |
| 2019/0012716 | A1* | 1/2019 | Murakami ............ G06F 16/532 |
| 2020/0160051 | A1* | 5/2020 | Golding ............ G06K 9/00469 |
| 2020/0272385 | A1* | 8/2020 | Navarro ................ G06F 3/1208 |
| 2020/0304670 | A1* | 9/2020 | Suzuki ............... G06K 9/00449 |
| 2020/0311883 | A1* | 10/2020 | Ueno ................... G06N 3/0472 |
| 2021/0049394 | A1* | 2/2021 | Nakatani ............ G06K 9/00442 |

FOREIGN PATENT DOCUMENTS

| JP | 2001-202466 A | 7/2001 |
| JP | 2013-142955 A | 7/2013 |
| JP | 2015-184815 A | 10/2015 |
| JP | 2016-126796 A | 7/2016 |

\* cited by examiner

*Primary Examiner* — Helen Zong
(74) *Attorney, Agent, or Firm* — Oliff PLC

(57) ABSTRACT

An information processing apparatus includes a processor. The processor is configured to, in response to acquisition of a read image of a second document whose type is identical to a type of a first document, extract a character string included in, in the read image of the second document, a region where information about surroundings that matches first-document surroundings information is acquired, the information about surroundings satisfying a matching condition for determining matching with the first-document surroundings information that is acquired from an image around an item value acquisition region including an item value to be extracted in a read image of the first document, the character string being extracted as an item value to be extracted in the read image of the second document.

13 Claims, 8 Drawing Sheets

FIG. 3

INVOICE                                Date October 1, 2018

X Research Laboratory Co., Ltd.

Bill to:
ABC Corporation
1-1-1, Y town, Nishi-ku, Yokohama-shi

Subject: Charge for using private cloud

| 07/01/2018-07/31/2018 | ¥10,000 |
| 08/01/2018-08/31/2018 | ¥20,000 |
| 09/01/2018-09/30/2018 | ¥30,000 |
| Total Amount | ¥60,000 |

21 — October 31, 2018 is the due date for payment.
Please pay into the account below.

Payment Details
DEF Bank, Yokohama Branch
Savings Account
Account No. 12345

FIG. 4

| ITEM | ITEM VALUE |
|---|---|
| ADDRESSEE | ABC CORPORATION |
| SENDER | X RESEARCH LABORATORY CO., LTD. |
| DUE DATE FOR PAYMENT | OCTOBER 1, 2018 |
| TOTAL AMOUNT | ¥60,000 |

| INVOICE | Date August 1, 2019 |

X Research Laboratory Co., Ltd.

Bill to:
ABC Corporation
1-1-1, Y town, Nishi-ku, Yokohama-shi

Subject: Charge for using private cloud

| | |
|---|---|
| 01/01/2019-01/31/2019 | ¥10,000 |
| 02/01/2019-02/28/2019 | ¥20,000 |
| 03/01/2019-03/31/2019 | ¥30,000 |
| 04/01/2019-04/30/2019 | ¥10,000 |
| 05/01/2019-05/31/2019 | ¥20,000 |
| 06/01/2019-06/30/2019 | ¥30,000 |
| 23 — 07/01/2019-07/31/2019 | ¥20,000 |
| Total Amount | ¥140,000 |

24 — August 31, 2019 is the due date for payment.
Please pay into the account below.

Payment Details
DEF Bank, Yokohama Branch
Savings Account
Account No. 12345

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-166157 filed Sep. 12, 2019.

BACKGROUND

(i) Technical Field

The present disclosure relates to an information processing apparatus and a non-transitory computer readable medium.

(ii) Related Art

There is a demand for increasing the efficiency of data management work by performing character recognition processing on a read image of a form or the like to extract a character string, and automatically extracting an item value of a desired item from the character string. The item value may be extracted by designating in advance an item name included in a form or by performing pattern matching. However, there is a case where a character string at an undesired position of the form is extracted as an item value.

In this case, a user is caused to designate a reading position of an item value so that a correct item value may be extracted, according to the related art (for example, Japanese Unexamined Patent Application Publication No. 2001-202466). The reading position designated by the user is recorded. Accordingly, when a form of a type identical to the type of the form whose reading position has been corrected is read thereafter, a correct item value may be extracted by extracting a character string from the reading position designated by the user.

Another example of the related art is disclosed in Japanese Unexamined Patent Application Publication No. 2013-142955.

SUMMARY

In a second document whose type is identical to the type of a first document in which a region for extracting a target item value is designated, the position of an item value to be extracted in the second document may be different from that in the first document because, for example, the number of items described in the second document is larger than that in the first document. In this case, it is not possible to extract an item value from a region in the second document corresponding to a region in the first document where a correct item value has been extracted.

Aspects of non-limiting embodiments of the present disclosure relate to a technique for extracting a target item value from a second document whose type is identical to the type of a first document more reliably than in the case of not using information acquired from the surroundings of an item value acquisition region including an item value to be extracted in the first document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor. The processor is configured to, in response to acquisition of a read image of a second document whose type is identical to a type of a first document, extract a character string included in, in the read image of the second document, a region where information about surroundings that matches first-document surroundings information is acquired, the information about surroundings satisfying a matching condition for determining matching with the first-document surroundings information that is acquired from an image around an item value acquisition region including an item value to be extracted in a read image of the first document, the character string being extracted as an item value to be extracted in the read image of the second document.

BRIEF DESCRIPTION OF THE DRAWINGS

An exemplary embodiment of the present disclosure will be described in detail based on the following figures, wherein:

FIG. 3 is a diagram illustrating an example of a document to be processed in the exemplary embodiment;

FIG. 4 is a diagram illustrating item values extracted from the document illustrated in FIG. 3;

FIG. 7 is a diagram illustrating another example of a document to be processed in the exemplary embodiment.

DETAILED DESCRIPTION

Hereinafter, an exemplary embodiment of the present disclosure will be described with reference to the drawings.

Figure 1:
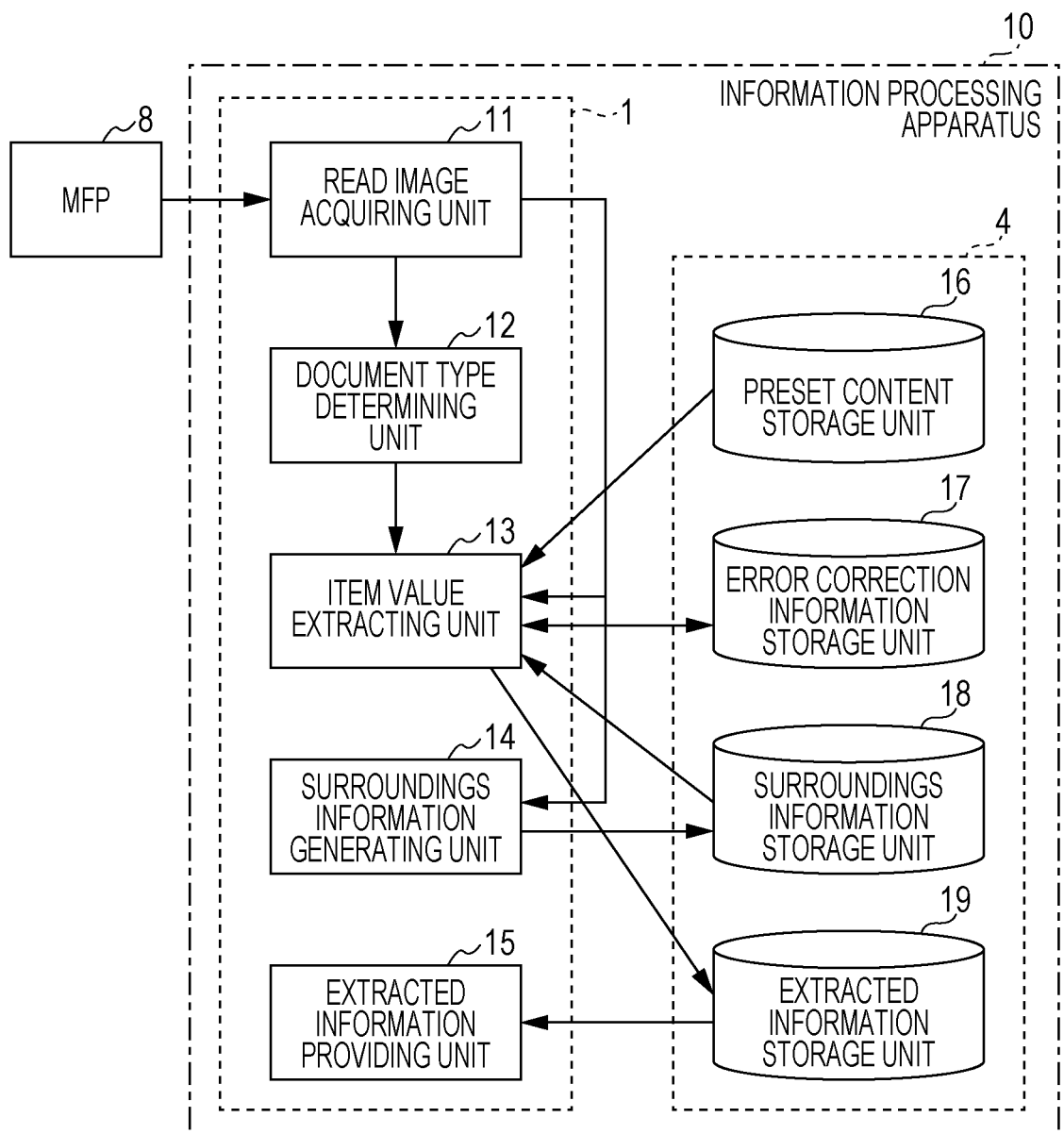
FIG. 1 is a block configuration diagram illustrating an information processing apparatus according to the exemplary embodiment of the present disclosure.

FIG. 1 is a block configuration diagram illustrating an information processing apparatus according to an exemplary embodiment of the present disclosure. FIG. 1 illustrates an information processing apparatus 10 according to the exemplary embodiment and a multifunction peripheral (MFP) 8 that transmits to the information processing apparatus 10 a read image generated by scanning a document.

Figure 2:
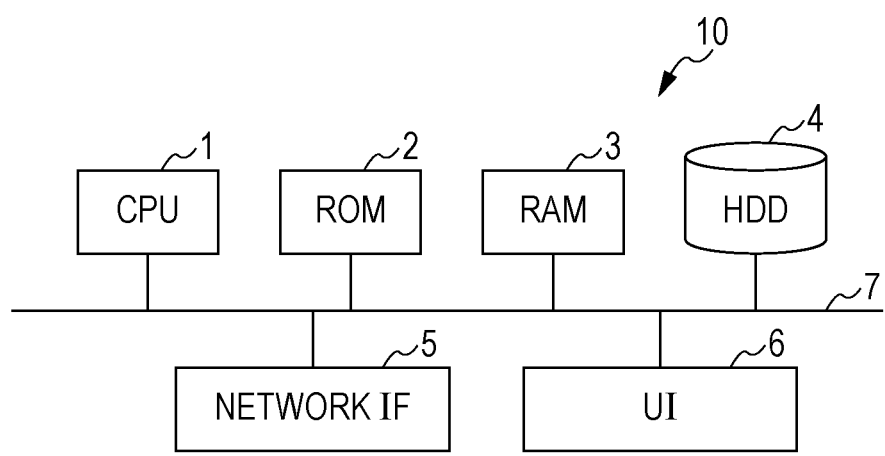
FIG. 2 is a hardware configuration diagram of the information processing apparatus according to the exemplary embodiment.

The information processing apparatus 10 according to the exemplary embodiment may be implemented by an existing general-purpose hardware configuration of a personal computer (PC) or the like. Thus, the information processing apparatus 10 according to the exemplary embodiment includes, as illustrated in FIG. 2, a central processing unit (CPU) 1, a read only memory (ROM) 2, a random access memory (RAM) 3, a hard disk drive (HDD) 4 serving as a memory, a network interface (IF) 5 serving as a communication unit for receiving a read image of a document from the MFP 8, and a user interface (UI) 6 that are connected to an internal bus 7. The UI 6 may include a mouse and keyboard serving as an input unit, and a display serving as a display unit. Alternatively, a touch-screen-type liquid crystal panel or the like functioning as both an input unit and a display unit may be used as the UI 6.

The MFP 8 is an example of an image forming apparatus having various functions, such as a copy function and a scan function, and is an apparatus incorporating a computer. The MFP 8 may be implemented by an existing general-purpose hardware configuration similarly to the information processing apparatus 10.

Referring back to FIG. 1, the information processing apparatus 10 according to the exemplary embodiment includes a read image acquiring unit 11, a document type determining unit 12, an item value extracting unit 13, a surroundings information generating unit 14, an extracted information providing unit 15, a preset content storage unit 16, an error correction information storage unit 17, a surroundings information storage unit 18, and an extracted information storage unit 19. The components that are not used in the description of the exemplary embodiment are not illustrated in the figure.

The read image acquiring unit 11 acquires a read image of a document generated by scanning the document by the MFP 8. The document type determining unit 12 analyses the read image of the document to determine the type of the document. The item value extracting unit 13 extracts, from the read image of the document, an item value of an item set in advance as a target to be extracted in the type of the document, and stores the extraction result in the extracted information storage unit 19. The surroundings information generating unit 14 generates surroundings information in a case where the item value extracting unit 13 fails to extract a correct item value as a result of attempting to extract an item value in accordance with preset content. The details of the surroundings information will be described below. The extracted information providing unit 15 provides a user with an extraction result of an item value obtained by the item value extracting unit 13. The individual storage units 16 to 19 will be described below together with the operation.

The units 11 to 15 included in the information processing apparatus 10 are implemented by an cooperative operation performed by the computer serving as the information processing apparatus 10 and a program run by the CPU 1 mounted in the computer. The storage units 16 to 19 are implemented by the HDD 4 mounted in the information processing apparatus 10. Alternatively, the RAM 3 may be used, or an external memory may be used via a network.

In the exemplary embodiment, a description will be given under the assumption that the information processing apparatus 10 which is a single apparatus includes the units 11 to 19 that are used in the exemplary embodiment. Alternatively, these units may be provided in plural information processing apparatuses in a distributed manner. Alternatively, the computer mounted in the MFP 8 may be used as the information processing apparatus 10 according to the exemplary embodiment.

The program used in the exemplary embodiment may be provided by using a communication unit, or may be provided by storing it in a computer readable recording medium, such as a CD-ROM or a USB memory. The program provided via the communication unit or the recording medium is installed in the computer, the CPU 1 of the computer executes the program, and accordingly various processes are performed.

Next, an operation in the exemplary embodiment will be described.

The information processing apparatus 10 according to the exemplary embodiment extracts an item value of an item that is set in advance from a read image of a document. In the exemplary embodiment, pattern matching is adopted as a method for extracting an item value. That is, basically, the position of an item value in a document is not specified. The item value extracting unit 13 searches a read image of a document for a character string that matches preset content stored in the preset content storage unit 16, that is, a characteristic of an item set in advance as a target to be extracted or a characteristic of an item value of the item, and extracts the found character string as an item value of the item. A characteristic of an item is, for example, the position of the item in the document. A characteristic of an item value is, for example, a character string including a character string "corporation" or the like in a case where the item value to be extracted is a company name. The method for extracting an item value is not limited to pattern matching. For example, in a case where the position of an item value in a document is defined or in a case where an item name is defined, the item value may be extracted by using the defined information.

It is an item name that is set in advance to preset content as a target to be extracted, and it is an item value of an item specified by the item name that is actually extracted as a target from a read image of a document. Thus, in the exemplary embodiment, an "item" or an "item name" may described as a target to be extracted for the convenience of description.

FIG. 3 is a diagram illustrating an example of a document to be processed in the exemplary embodiment. FIG. 3 illustrates a form whose type is invoice, as an example of a document. FIG. 4 is a diagram illustrating a table including item values extracted from the form illustrated in FIG. 3. FIG. 4 illustrates pairs of the name of an item set in advance as a target to be extracted from the form and the item value of the extracted item.

In the setting example illustrated in FIG. 4, the item value extracting unit 13 is to extract, from an invoice issued by X Research Laboratory Co., Ltd., the item values of individual items "addressee", "sender", "due date for payment", and "total amount". As is clear from the example of the form illustrated in FIG. 3, correct item values have been extracted for "addressee", "sender", and "total amount", but a correct item value has not been extracted for "due date for payment".

In this case, the user causes a read image of the document illustrated in FIG. 3 (hereinafter also referred to as a "first document") to be displayed on a screen, and designates a display position of a correct item value corresponding to the item to be extracted (in this example, "due date for payment") in the read image. The user designates, as the display position, a display range of the correct item value. In the exemplary embodiment, a range including the item value to be extracted in the read image of the first document is referred to as an "item value acquisition region". In the example of the form illustrated in FIG. 3, it is clear that the "due date for payment" is "October 31, 2018". Thus, the user designates a range including "October 31, 2018", thereby setting an item value acquisition region 21 to the read image of the first document.

After the item value acquisition region 21 has been set, the item value extracting unit 13 generates error correction information by associating the following pieces of information to each other: identification information identifying the type of the form (for example, a "form type ID"); the item (in this example, the "due date for payment"); and information indicating the range of the item value acquisition region 21 in the first document, for example, coordinate information indicating the range in a coordinate system in which a predetermined position of the first document (for example, the upper left corner of the first document) is the origin, and registers the error correction information in the error correction information storage unit 17. At the time of the registration, the item value extracting unit 13 corrects the item value of "due date for payment" included in the extracted information illustrated in FIG. 4 from "October 1, 2018" to "October 31, 2018". Subsequently, the item value extracting unit 13 stores, in the extracted information storage unit 19, the extracted information in FIG. 4 acquired from the invoice in FIG. 3 issued by X Research Laboratory Co., Ltd. and the identification information identifying the invoice (for example, a "form ID") in association with each other. Because it is clear that the item "due date for payment" is a character string representing a date, the data type of the item value may be limited by adding, to the error correction information, information indicating that the item value is a character string representing a date.

Examples of a data type include alphanumeric characters, numeric characters, and the like. A desired data type (for example, a character string made up of three characters is divided into two characters and one character by a hyphen, like "XX-Y") may be set in the system (i.e., the information processing apparatus 10).

Accordingly, in the following process, when the read image acquiring unit 11 acquires a first document and then acquires a read image of a document (hereinafter referred to as a "second document") whose type is identical to the type of the first document, the item value extracting unit 13 refers to, for the item for which error correction information has been generated (in the above example, "due date for payment"), not the preset content but the error correction information, thereby extracting a character string included in a region corresponding to the position of the item value acquisition region 21 (hereinafter the region will also be referred to as an "extraction region") as the item value of the item (i.e., "due date for payment"). For the other items "addressee", "sender", and "total amount", the item value extracting unit 13 extracts respective item values by continuously using the preset content. The character string extracted from the item value acquisition region 21 is basically assumed to be a correct item value in the second document, as the character string has correctly been extracted from the item value acquisition region 21 in the first document.

In the exemplary embodiment, after the item value acquisition region 21 has been set, the surroundings information generating unit 14 generates surroundings information from an image around the item value acquisition region 21 in the following manner, and registers the surroundings information in the surroundings information storage unit 18. The generation of the surroundings information will be described with reference to FIG. 5.

Figure 5:
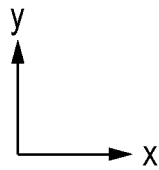
FIG. 5 is a diagram illustrating an example of a document used for describing generation of surroundings information in the exemplary embodiment.

FIG. 5 is a diagram illustrating a form identical to the form illustrated in FIG. 3. First, the surroundings information generating unit 14 attempts to extract images around the item value acquisition region 21 in four directions in the form. First, the surroundings information generating unit 14 analyses the read image of the form to detect a character string 22a "total amount" above the item value acquisition region 21. To recognize the character string as characters, character recognition is performed by using an optical character recognition (OCR) technique. The "character string" means a group of characters. In some cases, a group may include only one character. The surroundings information generating unit 14 includes the character string 22a detected in this manner in the surroundings information.

In addition, the surroundings information generating unit 14 detects a character string 22b "payment" on the right of the item value acquisition region 21. The character string 22a is positioned immediately above the item value acquisition region 21. However, it is not always necessarily to regard the closest character string ("is the due date for" on the right of the item value acquisition region 21) as surroundings information, and a characteristic word, phrase, noun, or the like may be regarded as surroundings information.

In addition, the surroundings information generating unit 14 detects a character string 22c "payment details" below the item value acquisition region 21. As described above, it is not always necessary to regard the character string "please pay" immediately below the item value acquisition region 21 as surroundings information.

There is no image on the left of the item value acquisition region 21. In this case, the surroundings information generating unit 14 detects an edge 22d of the form on the left of the item value acquisition region 21. Specifically, the distance to the edge 22d of the form represented by a coordinate value may be regarded as surroundings information.

In the above-described manner, the surroundings information generating unit 14 extracts images around the item value acquisition region 21 in the four directions in the form (in the above example, the character strings 22a to 22c). In a case where an image does not exist, the distance to the edge 22d of the form is acquired. In this way, the surroundings information generating unit 14 generates surroundings information from the information acquired from the surroundings of the item value acquisition region 21 and registers the surroundings information in the surroundings information storage unit 18. Specifically, the surroundings information generating unit 14 generates the surroundings information by associating, with the form type ID identifying the type of form for which surroundings information is generated, the directions from which the surroundings information has been acquired and the pieces of information 22a to 22d such as character strings existing in the directions.

In the exemplary embodiment, the acquired character strings 22a to 22c are included in the surroundings information. Alternatively, information indicating the distances from the item value acquisition region 21 may also be included in the surroundings information, like the edge 22d. The information on the form to be included in the surroundings information may be, for example, a ruled line or an image of a table (or information such as a character string in a table) or photograph existing around the item value acquisition region 21. Alternatively, a characteristic of an existing ruled line, table, photograph, or the like may be included in the surroundings information.

In the case of extracting an item value from a document, the position of the item value is typically detected by referring to information related to the item value, for example, the position of the corresponding item name or the like in the document. Specifically, an item value is extracted by estimating that the item value is on the right of or immediately below the item name in the form. Of course, information related to the item value, such as the item name, may be regarded as surroundings information. In the exemplary embodiment, as is clear from the description given above, surroundings information is generated by using the character strings or the like 22a to 22d that are not related to the item corresponding to the item value acquisition region 21.

According to the description given above, surroundings information is generated on the basis of the information acquired from the four directions including up and down directions (y-axis directions) and right and left directions (x-axis directions) of the item value acquisition region 21. However, the directions are not limited to the four directions as long as the surroundings of the item value acquisition region 21 are included. For example, the directions may be at least one direction, or may be four or more directions.

Depending on a type of document, the position of an item value may vary among documents. For example, FIGS. 3 and 7 illustrate examples of invoices of an identical format issued by X Research Laboratory Co., Ltd., but the layouts thereof are different because the numbers of cases of charge for using private cloud are different. For example, compared with the first document in FIG. 3 including the item value acquisition region 21, the second document in FIG. 7 has a larger number of cases of charge for using private cloud and accordingly the item value of the item "due date for payment" is located lower.

In this way, even when the first document and the second document are of an identical type, as is clear from the difference in layout between the forms illustrated in FIGS. 3 and 7, it is not possible to correctly extract the item value of the item "due date for payment" from a region (i.e., "extraction region") 23 in the read image of the second document corresponding to the position of the item value acquisition region 21 set in the read image of the first document. Both the documents have an identical size, and thus the coordinate value specifying the item value acquisition region 21 is equal to the coordinate value specifying the extraction region 23.

Now, a type of document will be described. A form is used as an example of a document herein.

The type of a form is specified on the basis of the provider (also referred to as the "issuer") of the form, the recipient (also referred to as the "addressee") of the form, and the category of the form. The category of the form (hereinafter "form category") may also be generally referred to as the type of the form, and represents a group to which the form is classified. Among forms, an invoice, an estimate, a purchase order, a contract, and the like are classified into the form category. The invoice in FIG. 3 issued by X Research Laboratory Co., Ltd. is classified into a form category of invoice. "Forms of an identical type" are forms whose issuer and form category are identical. The form illustrated in FIG. 3 and the form illustrated in FIG. 7 are forms of an identical type because the issuers thereof ("X Research Laboratory Co., Ltd.) and the form categories thereof ("invoice") are identical.

In many cases, the forms created by one company are basically similar to each other in the format even if the types are different. For example, the positions of individual items, such as a form name, a date of issue, an addressee, and a sender, in forms are often substantially identical even if the forms are of different types. Thus, forms whose categories are different and whose issuers are identical may be included in "forms of an identical type". In addition, forms of a certain type include substantially the same items. For example, an invoice includes a sender, an addressee, a due date for payment, an amount charged, and so forth. Thus, invoices issued by different companies basically have similar formats. Thus, forms whose issuers are different and whose categories are identical may be included in "forms of an identical type". In this way, forms having similar characteristics of formats or items may be defined as forms of an identical type.

As described above, in a case where it is not possible to extract a correct item value from the first document by using the preset content, the item value extracting unit 13 sets the item value acquisition region 21 so that a correct item value may be extracted in accordance with a user operation. However, in some cases, it is not possible to extract a correct item value from the extraction region 23 of the second document corresponding to the position of the item value acquisition region 21 of the first document due to a difference in layout between the forms of the first and second documents. The exemplary embodiment is characterized in that a correct item value may be extracted from the read image of the second document even in such a case.

Figure 6A:
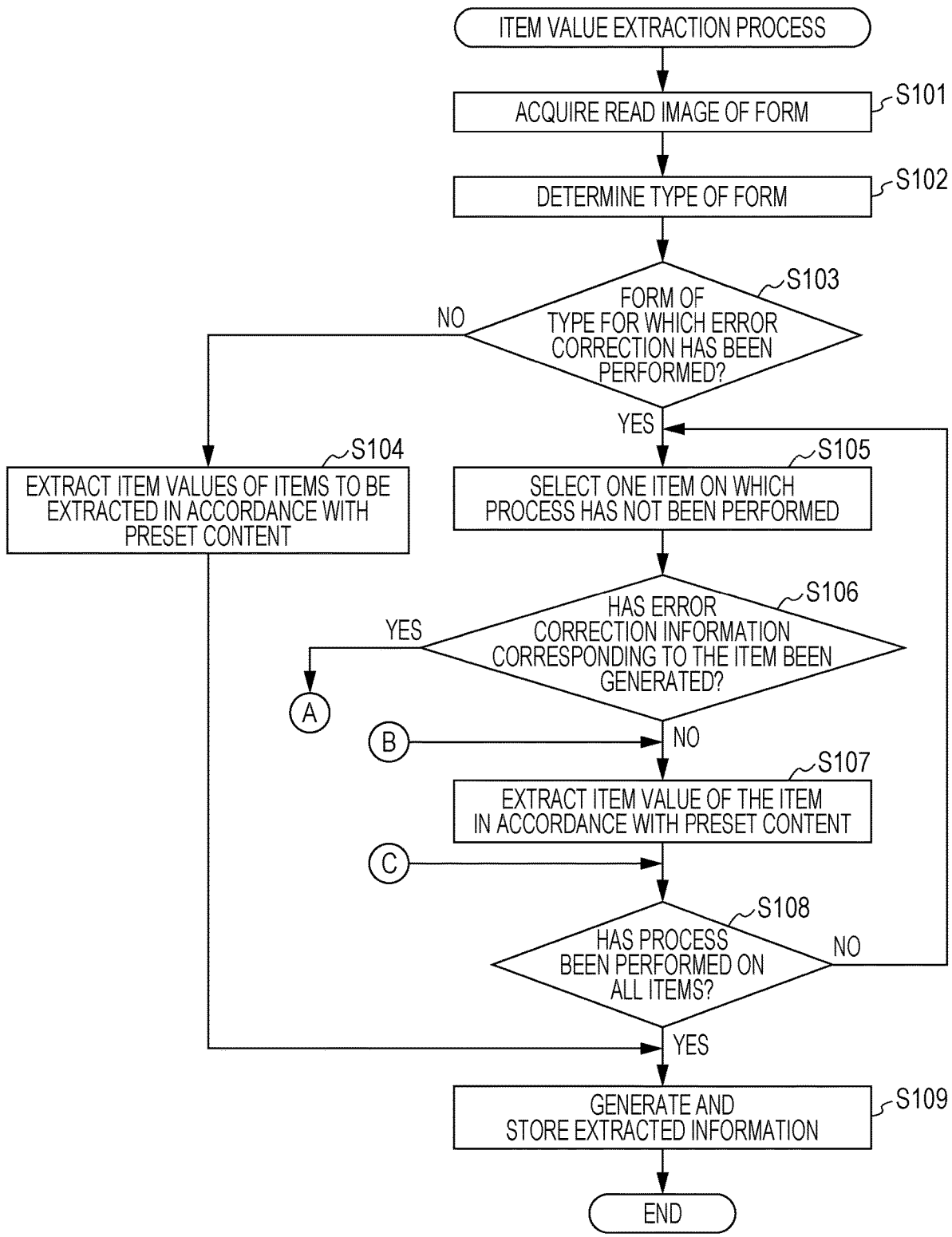
FIG. 6A is a flowchart illustrating an item value extraction process according to the exemplary embodiment.
Figure 6B:
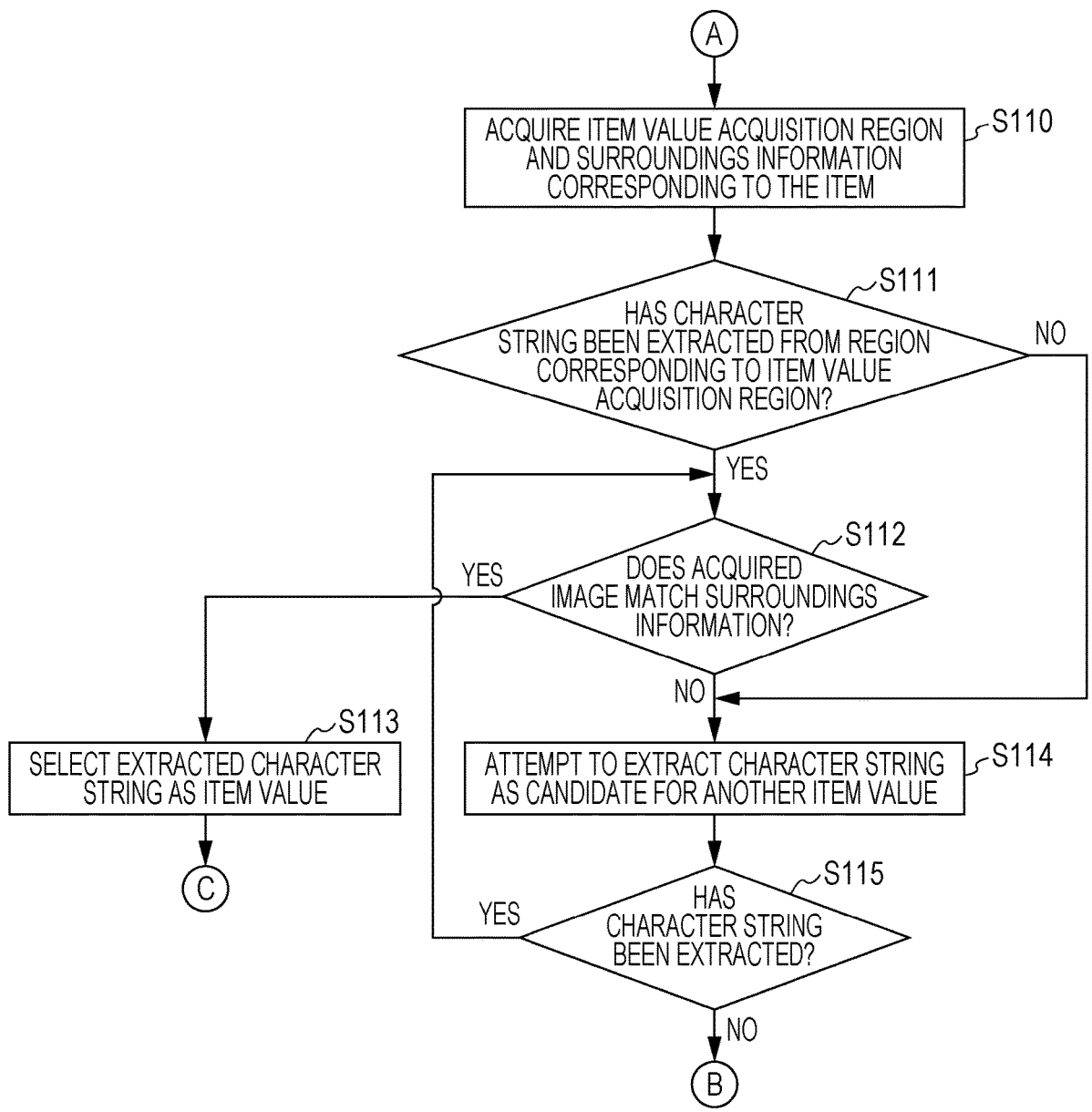
FIG. 6B is a flowchart continued from FIG. 6A.

Hereinafter, an item value extraction process according to the exemplary embodiment will be described with reference to the flowcharts illustrated in FIGS. 6A and 6B. It is assumed here that a process for the first document has already been completed. Thus, error correction information and surroundings information may have been generated as appropriate.

In response to acquisition of a form corresponding to the above-described second document (hereinafter also referred to as a "second form") by the read image acquiring unit 11 (step S101), the document type determining unit 12 determines the type of the form (step S102). Specifically, for example, the document type determining unit 12 makes a determination by acquiring a form name written on the second form by using an OCR technique or by reading code information in a case where the code information (for example, a barcode or a QR code (registered trademark)) specifying the type of form is added to the second form.

Subsequently, the item value extracting unit 13 extracts, from the second form, the item value of an item set in advance. Before that, the item value extracting unit 13 determines whether error correction has been performed for the type of form determined by the document type determining unit 12. Whether error correction has been performed may be determined by determining whether error correction information corresponding to the type of the form has been registered in the error correction information storage unit 17.

If the second form is not a form of a type for which error correction has been performed (NO in step S103), the item value extracting unit 13 extracts, from the read image of the second form, the item values of individual items to be extracted in the type of the form, in accordance with the preset content corresponding to the type of the second form set in the preset content storage unit 16 (step S104). Subsequently, the item value extracting unit 13 associates the item values with the items to be extracted as illustrated in FIG. 4 to generate extracted information, and stores the extracted information in the extracted information storage unit 19 (step S109).

On the other hand, if the second form is a form of a type for which error correction has been performed (YES in step S103), the item value extracting unit 13 performs the following process for each item to be extracted in the second form. First, the item value extracting unit 13 selects, from among the items to be extracted, one item on which the following process has not been performed (step S105). If error correction information corresponding to the item has not been generated (NO in step S106), the item value extracting unit 13 extracts the item value of the item from the read image of the second form in accordance with the preset content corresponding to the type of the second form set in the preset content storage unit 16 (step S107). If the above process for all the items to be extracted in the second form has not been completed (NO in step S108), the process returns to step S105. On the other hand, if the above process for all the items to be extracted has been completed (YES in step S108), the item value extracting unit 13 generates extracted information in the manner described above, and stores the extracted information in the extracted information storage unit 19 (step S109).

If error correction information corresponding to the selected item has been generated (YES in step S106), the item value extracting unit 13 acquires, from each of the storage units 17 and 18, error correction information and surroundings information including the item value acquisition region 21 corresponding to the item (step S110).

Subsequently, the item value extracting unit 13 attempts to extract a character string from a region (the above "extraction region") in the second form corresponding to the position of the acquired item value acquisition region 21. If the character string has been extracted (YES in step S111), the item value extracting unit 13 acquires an image from the surroundings of the extraction region in a manner similar to the above-described generation of surroundings information. If the acquired image matches the surroundings information acquired in step S110 (YES in step S112), the item value extracting unit 13 selects the character string extracted through the attempt as the item value of the item (step S113). Subsequently, the process proceeds to step S108.

FIG. 7 is a diagram illustrating an example of layout of a form of a type identical to the type of the form illustrated in FIG. 3 (hereinafter also referred to as a "first form"). In this example, the position of the item value of the item "due date for payment" is lower because the number of cases of charge for using private cloud is increased. Assuming that the second form has the same layout as that of the form illustrated in FIG. 3 (first form), the information acquired from the surroundings of the extraction region of the second form is identical to the surroundings information generated on the basis of the first form. Thus, a correct item value of the item "due date for payment" may be extracted from the extraction region corresponding to the position of the item value acquisition region 21. On the other hand, in a case where the form illustrated in FIG. 7 is the second form, even if the second form and the first form are of an identical type, the information acquired from the surroundings of the extraction region 23 of the second form does not match the surroundings information generated on the basis of the first form illustrated in FIG. 3. In this case (NO in step S112), the item value extracting unit 13 analyses the second form to attempt to extract a character string as a candidate for another item value (step S114).

For example, the item value of the item "due date for payment" is a character string representing a date, and thus a character string configured to form a date is extracted from the second form. In a case where a target to be extracted is the item "sender" or "addressee", the item value thereof typically includes a character string such as "corporation", "Co., Ltd.", "limited company", or the like. Thus, an attempt is made to extract a character string including such a character string. In a case where a target to be extracted is the item "total amount", the item value thereof includes a character string made up of numerals, and "¥" is added to the top of the character string or "yen" is added to the end of the character string. Thus, an attempt is made to extract a character string having this rule.

In this way, the item value extracting unit 13 attempts to extract a character string in accordance with the rule for extracting a character string corresponding to the item set in advance in the system (i.e., the information processing apparatus 10).

If a character string as a candidate for another item value has been extracted (YES in step S115), the item value extracting unit 13 acquires an image from the surroundings of the region of the extracted character string in a manner similar to that of generating surroundings information described above. Subsequently, the item value extracting unit 13 determines whether the acquired image matches the surroundings information acquired in step S110. The process performed thereafter is similar to that described above, and thus the description is not repeated. The example of the second form illustrated in FIG. 7 includes many character strings representing dates similar to the item "due date for payment", and thus steps S112, S114, and S115 are repeatedly performed until a region including the item value of the item "due date for payment" is selected.

On the other hand, if a character string as a candidate for another item value is not extracted any more (NO in step S115), the process proceeds to step S107, where the item value extracting unit 13 extracts the item value of the item from the read image of the second form in accordance with the preset content (step S107). In this case, there is a possibility that a correct item value may be extracted in accordance with the preset content. If a correct item value is not extracted, the user corrects extracted information similarly to the above. Alternatively, the user may set the item value acquisition region 21 again as appropriate.

In a case where the character string included in the extraction region 23 is a date as illustrated in FIG. 7, there is a possibility that "07/01/2019" may be extracted as the item value of the item "due date for payment". However, in the exemplary embodiment, the information acquired from the surroundings of the extraction region 23 is compared with the surroundings information corresponding to the item value acquisition region 21. Similarly to the surroundings information, there may be an edge of the form on the left of the extraction region 23 illustrated in FIG. 7. However, the images in the other directions do not match the surroundings information, and thus "07/01/2019" is not extracted as the item value of the item "due date for payment". As a result of step S114 being repeatedly performed, a region 24 is eventually selected. In the example of the form illustrated in FIG. 7, the information acquired from the surroundings of the region 24 matches the surroundings information, and thus "August 31, 2019" may be extracted as a correct item value of the item "due date for payment".

In the exemplary embodiment, it is determined whether or not the information acquired from the surroundings of a region where a character string is extracted in step S114 (hereinafter the region will be referred to as a "candidate extraction region") matches the surroundings information, and thereby it is determined whether there is a correct item value in the candidate extraction region. In the exemplary embodiment, the surroundings information is generated on the basis of the images in the four directions of up, down, right, and left directions around the item value acquisition region 21, and thus an item value is extracted from a region of the second document where information about surroundings that matches the surroundings information in all the four directions is acquired.

However, in the second document, the position of a character string included in surroundings information may be different from that in the first document because of, for example, an increased number of description items and rows. In addition, in a case where a character string in the first document set as surroundings information is an item value, there is a high possibility that the item value of the corresponding item in the second document is different from that in the first document. In a case where the item values are different, the information acquired from the surroundings of the extraction region 23 does not match the surroundings information. Even if the item value acquisition region 21 and the extraction region 23 (or a candidate extraction region) are at positions corresponding to each other, the distance from the extraction region 23 to the edge of the document (i.e., a coordinate value) does not match the surroundings information depending on a reading accuracy of the document.

Thus, at the time of determining whether the surroundings information acquired from the surroundings of the item value acquisition region 21 matches the information acquired from the surroundings of the extraction region 23 (or a candidate extraction region), the determination may be made with some tolerance. For example, in a case where the distance from the item value acquisition region 21 to the edge of the document is set to 2.0 cm in the surroundings information, a tolerance may be set such that a determination of matching is made when the distance from the extraction region 23 (or a candidate extraction region) to the edge of the document is in the range of 1.7 to 2.3 cm. In this way, a matching condition for determining whether the surroundings information acquired from the surroundings of the item value acquisition region 21 matches the information acquired from the surroundings of the extraction region 23 (or a candidate extraction region) may be set in advance, and if the matching condition is satisfied, a determination of matching may be made. For example, in a case where the surroundings information is represented by a distance, a matching condition is set in advance to make a determination of matching when an error is within ±0.3 cm. In this way, in a case where the information acquired from the surroundings of the extraction region (or a candidate extraction region) in the read image of the second document corresponding to the position of the item value acquisition region 21 satisfies the matching condition, a character string extracted from the extraction region is extracted as an item value.

Depending on a type of form, there is often a difference in layout, and the information acquired from the surroundings of the extraction region 23 (or a candidate extraction region) do not necessarily match the surroundings information in all the directions included in the surroundings information (in the above example, four directions of up, down, right, and left directions). In this case, a character string extracted from a region where information about surroundings having the highest degree of matching with the surroundings information is acquired is extracted as an item value. For example, in a case where there is no region where information about surroundings that matches the surroundings information in all the four directions is acquired, a character string extracted from a region whose surroundings match the surroundings information in the largest number of directions is selected as an item value.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in response to acquisition of a read image of a second document whose type is identical to a type of a first document, extract a character string included in, in the read image of the second document, a region where information about surroundings that matches first-document surroundings information is acquired, the information about surroundings satisfying a matching condition for determining matching with the first-document surroundings information that is acquired from an image around an item value acquisition region including an item value to be extracted in a read image of the first document, the character string being extracted as an item value to be extracted in the read image of the second document;
determine if the character string has been extracted from a region corresponding to the item value acquisition region;
determine if the acquired read image matches the first-document surroundings information; and
in response to determining that the acquired read image matches the first-document surroundings information, select the character string as the item value.

2. The information processing apparatus according to claim 1, wherein the processor is configured to, in a case where the read image of the second document does not include a region where information acquired from surroundings of the region satisfies the matching condition, extract as an item value a character string that has been extracted from a region where information about surroundings that has a highest degree of matching with the first-document surroundings information is acquired.

3. The information processing apparatus according to claim 2, wherein the processor is configured to, in a case where information acquired from surroundings of an extraction region in the read image of the second document corresponding to a position of the item value acquisition region satisfies the matching condition, extract as an item value a character string extracted from the extraction region.

4. The information processing apparatus according to claim 1, wherein the first-document surroundings information is represented by at least one of a ruled line, an image of a table or photograph, and a character string that are not related to an item.

5. The information processing apparatus according to claim 2, wherein the first-document surroundings information is represented by at least one of a ruled line, an image of a table or photograph, and a character string that are not related to an item.

6. The information processing apparatus according to claim 3, wherein the first-document surroundings information is represented by at least one of a ruled line, an image of a table or photograph, and a character string that are not related to an item.

7. The information processing apparatus according to claim 1, wherein the item value acquisition region is designated by a user.

8. The information processing apparatus according to claim 7, wherein the item value acquisition region is set as a result of being designated by the user in a case where the item value to be extracted is not extracted from a region that is set in accordance with a predetermined rule.

9. The information processing apparatus according to claim 1, wherein the processor is further configured to:
  determine that the read image of the second document does not include a region where information acquired from surroundings of the region satisfies the matching condition, and
  only in response determining that the read image of the second document does not include a region where information acquired from surroundings of the region satisfies the matching condition, extract as an item value a character string that has been extracted from a region where information about surroundings that has a highest degree of matching with the first-document surroundings information is acquired.

10. A non-transitory computer readable medium storing a program causing a computer to execute a process for information processing, the process comprising:
  in response to acquisition of a read image of a second document whose type is identical to a type of a first document, extracting a character string included in, in the read image of the second document, a region where information about surroundings that matches first-document surroundings information is acquired, the information about surroundings satisfying a matching condition for determining matching with the first-document surroundings information that is acquired from an image around an item value acquisition region including an item value to be extracted in a read image of the first document, the character string being extracted as an item value to be extracted in the read image of the second document;
  determine if the character string has been extracted from a region corresponding to the item value acquisition region;
  determining if the acquired read image matches the first-document surroundings information; and
  in response to determining that the acquired read image matches the first-document surroundings information, selecting the character string as the item value.

11. The non-transitory computer readable medium of claim 10, wherein the process further comprises:
  determine that the read image of the second document does not include a region where information acquired from surroundings of the region satisfies the matching condition, and
  only in response determining that the read image of the second document does not include a region where information acquired from surroundings of the region satisfies the matching condition, extract as an item value a character string that has been extracted from a region where information about surroundings that has a highest degree of matching with the first-document surroundings information is acquired.

12. An information processing apparatus comprising:
  means for, in response to acquisition of a read image of a second document whose type is identical to a type of a first document, extracting a character string included in, in the read image of the second document, a region where information about surroundings that matches first-document surroundings information is acquired, the information about surroundings satisfying a matching condition for determining matching with the first-document surroundings information that is acquired from an image around an item value acquisition region including an item value to be extracted in a read image of the first document, the character string being extracted as an item value to be extracted in the read image of the second document;
  means for determining if the character string has been extracted from a region corresponding to the item value acquisition region;
  means for determining if the acquired read image matches the first-document surroundings information; and
  means for, in response to determining that the acquired read image matches the first-document surroundings information, selecting the character string as the item value.

13. The information processing apparatus of claim 12, further comprising:
  means for determining that the read image of the second document does not include a region where information acquired from surroundings of the region satisfies the matching condition, and
  means for, only in response determining that the read image of the second document does not include a region where information acquired from surroundings of the region satisfies the matching condition, extracting as an item value a character string that has been extracted from a region where information about surroundings that has a highest degree of matching with the first-document surroundings information is acquired.

* * * * *